Patented Mar. 11, 1941

2,234,203

UNITED STATES PATENT OFFICE 2,234,203

STABILIZED PLASTIC POLYMER AND PROCESS OF PRODUCING THE SAME

Howard W. Starkweather, New Castle County, and Arnold M. Collins, Wilmington, Del., assignors to E. I. du Pont de Nemours & Company, Wilmington, Del., a corporation of Delaware No Drawing. Application March 16, 1938, Serial No. 196,186. In France March 18, 1937

22 Claims. (Cl. 260—89)

This invention relates to the treatment of plastic polymers of halogen-2-butadienes-1,3 and their homologues. More specifically it relates to the treatment of plastic polymers of chloro-2-butadiene-1,3 (hereinafter, for convenience, referred to as chloroprene). More particularly, it relates to stabilization of the plastic polymers of these halogen dienes.

Many of the polymers of chloroprene and particularly those made in emulsion in the presence of certain modifying agents as disclosed, for example, in the copending applications of Starkweather, filed March 19, 1936, and given Serial No. 69,739; Starkweather and Collins, filed March 19, 1936, and given Serial No. 69,737; and Starkweather and Collins, filed July 30, 1937, and given Serial No. 156,518; are soft and plastic when first isolated and lend themselves readily to the common operations of rubber technology such as milling, calendering and tubing. On standing at ordinary temperatures or sometimes when allowed to warm during milling, these polymers have a tendency to lose their plasticity and become tough and elastic, even in the presence of antioxidants, such as phenyl beta naphthylamine. Thus, on storage under ordinary conditions they show a decided tendency to lose their plasticity within periods as short as three months and at temperatures of about 70° C. they exhibit this decided tendency within 24 hours. It thus becomes very difficult or impossible to handle them with ordinary rubber machinery and hence their use is limited.

It is an object of this invention to maintain in the plastic condition during milling and storage heat curable plastic polymers of halogen-2-butadienes-1,3 and their homologues in which the hydrogen atom on carbon atom 3 is replaced by a hydrocarbon group, particularly, heat curable plastic polymers prepared by polymerizing the halogen butadiene or its homologue in the presence of modifying agents, preferably while the halogen butadiene or homologue is emulsified in an aqueous medium as disclosed in the applications, referred to above. A more specific object is to maintain such heat curable plastic polymers of chloroprene in the plastic condition during milling and on storage for periods much longer than three months under ordinary conditions. A still further object is to provide means for maintaining the plasticity of these polymers, which means, however, does not substantially reduce their capacity to be converted under curing conditions to the strong elastic state resembling vulcanized rubber. Other objects will appear hereinafter.

With these objects in mind it has now been discovered that the plasticity of heat curable plastic polymers of halogen-2-butadienes-1,3 and their homologues of the general formula

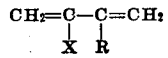

in which X is halogen and R is hydrogen or a hydrocarbon radical, particularly, polymers of this type prepared by polymerizing the halogen butadiene in the presence of modifying agents, preferably while it is emulsified in water, for example, as disclosed in the copending applications, identified above, may be retained within desired limits during storage for long periods of time and also under milling conditions without, however, substantially reducing their capacity to be converted under curing conditions to the strong elastic state resembling vulcanized rubber, by having present with them as stabilizers relatively small amounts of ammonium salts. The invention is particularly applicable to heat curable chloroprene plastic polymers although it includes within its scope the stabilization of other halogen butadienes, such as bromo-2-butadiene-1,3 and chloro-2-methyl-3-butadiene-1,3. A more specific group of polymers which are much improved by stabilization are those obtainable by polymerizing the halogen dienes of the above general formula while they are dispersed in an acid aqueous medium in the presence of modifying agents. It will be apparent that of this latter group those obtained from chloroprene are preferred in view of the preference for chloroprene polymers already expressed and because of their many advantageous properties. Further information as to the polymerization of these halogen dienes in the presence of modifying agents may be had by referring to the above-identified copending applications.

The following examples are included in order to more fully illustrate the invention, and it should be understood that these examples are given for this purpose alone, and that accordingly they are not to be construed as limiting the scope of the invention.

In these examples and throughout this application, whenever the term "plasticity number" is used, it refers to the thickness in thousandths of an inch of a 2.5 cc. sample of the polymer in the form of a cylinder ⅝" in diameter which has been heated to 80° C. for 15 minutes and then kept under a weight of five kilograms for three minutes at 80° C. It will be obvious that the plasticity will vary inversely as the plasticity number, lower plasticity numbers indicating more plastic materials. It has been found that to be milled satisfactorily a polymer should, in general, have a plasticity number less than 125.

The term "regain" is also used in this application and wherever it occurs herein refers to the gain in thickness in thousandths of an inch of the compressed sample, from the plasticity test, when freed from pressure for one minute at room temperature. For satisfactory milling this "regain" should, in general, be less than 25. In addition, it should be noted that whenever, throughout these examples, the term "parts" is used, it refers to "parts by weight."

A plastic polymer of chloroprene was prepared according to the method disclosed in a copending application of Starkweather and Collins, Serial No. 156,518, filed July 30, 1937, by polymerizing chloroprene in acid aqueous emulsion in the presence of 0.75% of thioglycolic acid and 0.06% of hydrogen sulfide (both based on the amount of chloroprene used). The dried, finished polymer containing no stabilizer or antioxidant was divided into two portions, one of which was treated with 1% of phenyl beta naphthylamine by incorporation on a rubber mill and was retained as a control. The other portion was treated with 1% of phenyl beta naphthylamine and 2% of the compound to be used as stabilizer on a rubber mill. The plasticity numbers and regain of both samples were determined at once and after aging for 24 and 48 hours in an air oven at 70° C. The table below gives the plasticity data thus obtained for polymer treated and untreated with a stabilizer as disclosed herein.

| Example No. | Agent added in addition to phenyl-b-naphthylamine | Plasticity number and regain after aging at 70° C. for— | | |
|---|---|---|---|---|
| | | 0 hrs. | 24 hrs. | 48 hrs. |
| 1 | None (control) | 77-2 | 127-45 | 139-63 |
| | Octadecyl trimethyl ammonium bromide | 76-2 | 89-1 | 104-2 |
| 2 | None (control) | 77-3 | 150-90 | |
| | Dimethyl "Stenyl" amine hydrobromide* | 70-3 | 94-0 | 100-6 |
| 3 | None (control) | 77-3 | 150-90 | |
| | Stearylamine hydrobromide | 75-1 | 102-2 | 110-3 |
| 4 | None (control) | 109-7 | 264-46 | |
| | Cetyl pyridinium bromide | 85-4 | 111-6 | 132-85 |
| 5 | None (control) | 77-1 | 129-66 | 144-73 |
| | Tetramethyl ammonium bromide | 73-4 | 102-2 | 112-1 |
| 6 | None (control) | 77-3 | 150-90 | |
| | o-Toluidine hydrobromide | 82-2 | 118-2 | 125-72 |
| 7 | None (control) | 109-7 | 264-46 | |
| | Ammonium bromide | 79-1 | 101-4 | 137-103 |
| 8 | None (control) | 109-7 | 264-46 | |
| | Di-"Stenyl" dimethyl ammonium iodide* | 97-6 | 125-32 | 150-103 |

*"Stenyl" is a mixture of cetyl and stearyl groups.

It will be seen from inspection of this table that all the ammonium salts added have a very pronounced effect in reducing the change in plasticity on aging at 70° C. A similar improvement over untreated polymer exists as regards the change of plasticity at room temperature, the test at 70° C. being used because it gives in a few days data on change in plasticity which require months to obtain at ordinary temperature.

This invention is not limited to the use of the ammonium salts mentioned above; unsubstituted ammonium salts or those in which from one up to four of the hydrogen atoms of the ammonium group, NH₄, are substituted by organic radicals may be used. These radicals may be either unsubstituted hydrocarbon radicals (either aliphatic or aromatic) or, for example, hydrocarbon radicals in which one or more hydrogen atoms have been replaced by substituents such as Cl, Br, I, $NO_2$, and $COCH_3$, as in stearyl dimethyl acetonyl ammonium chloride. The hydrocarbon radical may be polyvalent and attached through two or more of its valences to the same nitrogen atom (as in the case of cetyl pyridinium bromide used above) or to the nitrogen atoms of two or more ammonium groups, as in the case of the dihydrohalides of the diamines. The substituted ammonium salt is not necessarily a halide. For example, a salt such as phenyl trimethyl ammonium methyl sulfate, $C_6H_5(CH_3)_3N—SO_4—CH_3$ may be used effectively. For the purpose of the present invention, the term "ammonium salt" is intended to include compounds of all the types mentioned above.

The following list of ammonium salts suitable for use according to the present invention further illustrates the wide application of the invention:

Cetyl trimethyl ammonium bromide
Phenyl dimethyl octadecyl ammonium bromide
Cetyl trimethyl ammonium methyl sulfate
Tetra ethyl ammonium bromide
Tetra methyl ammonium iodide
Di-"Stenyl" dimethyl ammonium chloride
Di-"Stenyl" dimethyl ammonium bromide
Phenyl dimethyl iso butyl ammonium bromide
Trimethylamine hydrobromide
Dimethylamine hydrobromide
Aniline hydrobromide
Aniline hydrochloride
o-Toluidine hydrochloride
p-Xylidine hydrochloride
Dicyclohexylamine hydrobromide
Monoethylaniline hydrobromide
Diphenyl guanidine hydrobromide
Diortho tolyl guanidine hydrobromide
Tetra butyl ammonium bromide
Dibutyl distearyl ammonium chloride
Benzyl butyl dimethyl ammonium iodide
(1:3) (2) Xylidine hydrobromide
Allylamine hydrobromide
Di iso propylamine hydrobromide
Tributylamine hydrobromide
Dibenzylamine hydrobromide
a-Naphthylamine hydrobromide
N-dibutyl piperidinium chloride
Isopropyl pyridinium bromide The ammonium salts to be used according to the present invention should preferably, however, be as free as possible from free bases, because the primary aromatic amines and primary, secondary, and tertiary aliphatic amines as free bases have an influence on the plastic polymer which is contrary to the objects to be accomplished by this invention, i. e., they tend to accelerate the change from a plastic to an elastic condition. The preferred compounds are the long chain hydrocarbon substituted ammonium salts and particularly the bromides containing a straight chain aliphatic hydrocarbon group having from 12 to 18 carbon atoms, for example, the long chain trimethyl ammonium bromides, particularly cetyl trimethyl ammonium bromide, "Stenyl" trimethyl ammonium bromide, and stearyl trimethyl ammonium bromide.

The amounts of such agents which have been used with success in the polymers may vary from about 0.1% to about 5% or more based on the polymer. With lower concentrations, up to about 1% in the case of the stabilizing agents of lower molecular weight, the effectiveness of the compound increases very materially with an increase in the amount of material present, but the increase rapidly falls off with higher concentrations, i. e., above about 2%. An excess of stabilizing agent appears to remain as inert material. Preferably, therefore, about 1 to 2%, based on the polymer, of the lower molecular weight stabilizing agents should be present. In the case of the stabilizing agents of higher molecular weight larger proportions may be required to produce similar effects.

For the purposes of this invention, these stabilizing agents may be added to the polymer at any time after the polymerization process has been carried to the point desired, in amounts such that the total amount of stabilizer present in the polymer after the addition is, at least, that amount which will produce a definite stabilizing effect, i. e., about 0.1% to about 5% based on the weight of the polymer, as disclosed above. It is obvious that if the stabilizer is added to the dispersion and is one which is soluble in the dispersing medium, it is necessary to add a greater amount than the amount desired in the polymer because some will be carried off with the dispersing medium when the polymer is isolated. Also where the polymer is given any treatment following the addition or the adjustment of the amount of stabilizer desired, which results in a loss of an appreciable amount of the stabilizer, it should be replaced at a later stage of the process, preferably during the final milling step, that is, if the amount lost decreases the amount present below the desired content.

It should be understood that mixtures of two or more of the stabilizing agents disclosed herein may be used and that, where two or more stabilizing agents are used, their effects are, in general, additive, i. e., if one is present and another is added, it will increase the stabilizing effect. It is also possible to use a stabilizer of another class in combination with an ammonium salt of the type described herein. For example, an ammonium salt as described herein, may be used in combination with an aromatic mercaptan (the use of which is broadly disclosed in a copending application of Walker, Serial No. 69,740, filed March 19, 1936.) It will be obvious, of course, that two stabilizers which react chemically with each other so as to destroy their effectiveness cannot be used together. The amount of stabilizer added should be, at least, such that the total amount of stabilizer present after the addition is sufficient to produce a definite stabilizing effect, i. e., about 0.1% to about 5.0%, based on the weight of the polymer, as disclosed above.

The various ammonium salts which are included within the broad scope of this invention may be divided into classes. Thus, one class, which is a preferred class, would include those which are emulsifying agents. Another would include those which are not emulsifying agents but are water soluble or at least are much more soluble in water than they are in the polymer. Still another would embrace those which are not emulsifying agents and are not appreciably soluble in water or, at least, are more soluble in the polymer than they are in water. These distinctions are of importance in several connections. Thus, those which are emulsifying agents may be present in the polymer in small amounts as a result of their having been employed during the polymerization step. On the other hand, these salts as well as those which are substantially water soluble or at least are more soluble in water than they are in the polymer are preferably added after coagulation where emulsion polymerization is resorted to since if added to the dispersion, at most only a portion of the quantity added remains in the polymer after coagulation. If, however, the agent is not soluble in water, addition of it to the dispersion prior to coagulation may be preferable particularly if the agent is substantially more soluble in the polymer than it is in water, for the reasons that addition to the dispersion facilitates thorough mixing of polymer and salt and permits immediate stabilization of the polymer after it reaches the desired state of plasticity. Of course, if emulsion polymerization is not resorted to stabilization with any of these ammonium salts may be effected immediately after the polymer is obtained.

As disclosed above, however, even though the one or another procedure is preferred, the ammonium salt stabilizers may be added to the polymer before isolation or to the dry finished polymer as well as at some intermediate stage, for example, to the wet coagulum. Portions of the stabilizer may even be added at different times, if desired.

Where the stabilizer is added to the coagulated or finished polymer, the incorporation is most easily carried out by adding the salt, either as such or dissolved in a suitable solvent, to the polymer while it is being worked on a rubber mill or in other mixing devices known in the rubber art. For incorporating the salt into the polymer dispersion, the former is dispersed, preferably in the same dispersion medium as used for the polymer by any of the known methods applicable to such a system. This process is often facilitated by first dissolving the salt in a suitable solvent, such as benzene, which is not miscible with the water. Still other methods of incorporation will be obvious to those skilled in the art.

As disclosed above, the present invention is applicable generally to heat curable plastic polymers of halogen-2-butadienes-1,3 and their homologues. It is particularly applicable, however, to polymers of these halogen dienes which are prepared by polymerizing the dienes in non-alkaline emulsion in the presence of a small amount of a modifying agent. The modifying agents herein referred to are those disclosed in the following copending applications: Starkweather, Serial No. 69,739, filed March 19, 1936, which discloses emulsion polymerization of chloroprene in the presence of sulfur dioxide as a modifying agent; Starkweather and Collins, Serial No. 69,737, filed March 19, 1936, which has now matured into U. S. Patent No. 2,163,250, granted June 20, 1939, which discloses emulsion polymerization of chloroprene in the presence of hydrogen sulfide as a modifying agent; and Starkweather and Collins, Serial No. 69,738, filed March 19, 1936, and refiled July 30, 1937, as Serial No. 156,518 which discloses emulsion polymerization of chloroprene in the presence of organic modifying agents. The organic modifying agents which this latter case discloses are unpolymerizable acid-stable organic compounds which are capable of forming an addition product with compounds of the general formula

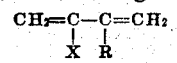

in which X is hydrogen and R is a member of the group consisting of hydrogen and hydrocarbon radicals under conditions of polymerization of such compounds of said general formula. This group of modifying agents includes the following classes of organic chemical compounds:

(1) Unsaturated compounds containing one or more carbonyl groups adjacent to the double bond;
(2) Aromatic sulfinic acids;
(3) Aromatic mercaptans;
(4) Mercapto-carboxylic acids;
(5) Aliphatic mercaptans.

A preferred form of the invention is its application to heat curable plastic polymers of chloroprene prepared according to the processes described in these copending applications, particularly such as are prepared by polymerizing the chloroprene while it is dispersed in an acid aqueous medium. Polymers prepared in the presence of modifying agents may be quite plastic and where rather plastic polymers are desired the particular applicability of the present process is obvious.

It will be noted that as disclosed in copending applications of Walker, Serial Nos. 69,740, and 154,212, filed respectively on March 19, 1936 and July 17, 1937, and many of the organic modifying agents disclosed in the Starkweather and Collins application, Serial No. 156,518, filed July 30, 1937, are also effective as stabilizing agents, and that many of the ammonium salts, described herein as stabilizing agents, are useful as emulsifying agents in the modified polymerization processes which are described in copending applications, hereinbefore identified. Certain of these modifying agents are, however, largely consumed during the polymerization under some conditions and the amounts of those emulsifying agents which are also stabilizing agents and which are present during the polymerization are frequently insufficient to produce the stabilizing effect desired in the finished polymer or else a portion of them is lost during some stage of the process. In general, therefore, even though there are present during the formation of a particular polymer some of the agents which are effective, both during the polymerization and as stabilizers, it may be desirable to add additional stabilizing agent to the polymer after the polymerization has reached the desired stage or at some later stage of the process in order to obtain the desired stabilizing effect in the final product.

In the above examples, 1% of an antioxidant, such as phenyl beta naphthylamine is added to the polymer along with the stabilizer. The antioxidant may be added at any time after polymerization has reached the desired stage. Besides serving as an antioxidant, materials such as phenyl beta naphthylamine also serve to arrest polymerization in emulsion and may be added for that purpose according to the processes disclosed in the above identified copending applications which disclose modified emulsion polymerization. It is possible to employ an ammonium salt as a stabilizer without the addition of an antioxidant but since polymers in which both are used are considerably more stable than those treated with an ammonium salt but no antioxidant, the use of salt and antioxidant together is preferred. The amount of phenyl beta naphthylamine to employ is about what is used in the above examples, i. e., about 1%, based on the polymer. Equivalent amounts of other antioxidants may be used in place of the phenyl beta naphthylamine.

It is also possible to effect the addition of the stabilizing agents disclosed herein by a continuous process as well as a batch process. This is conveniently accomplished by bringing together a stream of a dispersion of the polymer and a stream of a solution of the stabilizing agent in such a manner that they are thoroughly mixed. The amount of stabilizer added is obviously readily controlled by controlling the rates of flow of the two streams. It is, of course, clear that the stream comprising the polymer need not be a dispersion and that comprising the stabilizer need not be a solution. Solutions of polymer or dispersions of the stabilizer may, for example, be used. Obviously, however, whether one or both streams be a solution or a dispersion, means should be provided to mix them thoroughly, if thorough mixing does not otherwise take place.

Continuous emulsification combined with continuous polymerization and also combined with continuous addition of antioxidant is disclosed in the copending applications, identified above, which relate to modified polymerization and the combination of continuous stabilization as described herein with continuous production of polymer as described in those applications has been found to be very desirable. Thus, a stream of a solution or a dispersion of a stabilizing agent as disclosed herein is admitted into the pipe through which the dispersion of the polymer from the continuous polymerization is flowing, so that the two are thoroughly and continuously mixed. The amount of stabilizer added is readily controlled by varying the rate at which the stream of stabilizer is admitted into contact with the polymer dispersion. This will serve to illustrate the method. Obviously continuous production of stabilized polymer may be obtained without rigidly adhering to the particular scheme described. The present invention, therefore, is not limited to this exact method for continuous operation.

It is also possible to incorporate the antioxidant, for example, phenyl beta naphthylamine continuously in like manner, if an antioxidant is to be added. As disclosed above, the preferred procedure includes the addition of an antioxidant. The antioxidant may be added continuously, either as a separate stream as disclosed in the applications describing modified polymerization or it may be included in the same stream in which the stabilizer is included and, in fact, this latter variation has been found to be very convenient.

The stabilized polymer dispersions of the present invention may be employed as such or the stabilized polymer made in a dispersion may be isolated as a plastic mass and used in the same ways that the polymers which are isolated as plastic masses and then stabilized may be used. The uses of the polymer stabilized according to this invention are the same as those enumerated in the copending applications, above referred to, which disclose the modified polymerization, for the polymer dispersions and plastic masses produced according to the processes described in those applications.

The compositions produced by the process of this invention are novel as well as useful. These plastic polymer compositions possess the novel property of remaining in the plastic state for much longer periods than previously known compositions of such polymers, but are substantially as readily converted under curing conditions to highly elastic products as they would be if the polymers had not been treated with a stabilizer as described herein. The stabilized polymers exhibit no substantial tendency to lose their plasticity on storage under ordinary conditions for periods substantially in excess of three months or in the accelerated aging test at 70° C. for periods in excess of 24 hours.

It is apparent that many widely different embodiments of this invention may be made without departing from the spirit and scope thereof, and therefore it is not intended to be limited except as indicated in the appended claims.

We claim:

1. The process which comprises polymerizing chloro-2-butadiene-1,3, while dispersed in an acid aqueous medium, in the presence of 0.75% of thioglycolic acid and 0.06% of hydrogen sulfide, both based on the weight of the chloro-2-butadiene-1,3, then separating the polymer from the acid aqueous medium and incorporating with it about 1% of phenyl beta naphthylamine based on the weight of the polymer and about 2% of a mixture of cetyl and stearyl trimethyl ammonium bromide based on the weight of the polymer.

2. A composition comprising a heat-curable plastic polymer of a compound of the general formula

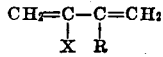

in which X is halogen and R is a member of the group consisting of hydrogen and hydrocarbon radicals having in chemical combination therewith an unpolymerizable acid-stable, organic modifying agent capable of forming addition products with compounds of the above general formula under conditions of polymerization of such compounds of the above general formula and also comprising a small amount of a hydrocarbon substituted ammonium salt.

3. A composition according to claim 2 wherein the compound of the general formula is chloro-2-butadiene-1,3.

4. A composition according to claim 2 wherein the compound of the general formula is chloro-2-butadiene-1,3 and wherein the ammonium salt is a bromide having a long straight chain aliphatic group substituted for one of the hydrogens of the ammonium radical.

5. The process which comprises incorporating a small amount of a hydrocarbon substituted ammonium salt into a heat-curable plastic polymer of a compound of the general formula

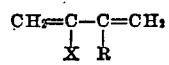

in which X is halogen and R is a member of the group consisting of hydrogen and hydrocarbon radicals having in chemical combination therewith an unpolymerizable acid-stable, organic modifying agent capable of forming addition products with compounds of the above general formula under conditions of polymerization of such compounds of the above general formula.

6. A process according to claim 5 wherein the compound of the general formula is chloro-2-butadiene-1,3.

7. A composition comprising a heat-curable plastic polymer of a compound of the general formula

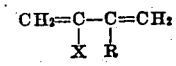

in which X is halogen and R is a member of the group consisting of hydrogen and hydrocarbon radicals having in chemical combination therewith a mercapto carboxylic acid and also comprising a small amount of a hydrocarbon substituted ammonium salt.

8. A composition according to claim 7 wherein the compound of the general formula is chloro-2-butadiene-1,3.

9. A composition according to claim 7 wherein the compound of the general formula is chloro-2-butadiene-1,3 and wherein the ammonium salt is a bromide having a long straight chain aliphatic group substituted for one of the hydrogens of the ammonium radical.

10. The process which comprises incorporating a small amount of a hydrocarbon substituted ammonium salt into a heat-curable plastic polymer of a compound of the general formula

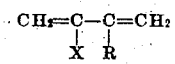

in which X is halogen and R is a member of the group consisting of hydrogen and hydrocarbon radicals having in chemical combination therewith a mercapto carboxylic acid.

11. A process according to claim 10 wherein the compound of the general formula is chloro-2-butadiene-1,3.

12. A composition comprising a heat-curable plastic polymer of a compound of the general formula

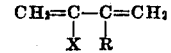

in which X is halogen and R is a member of the group consisting of hydrogen and hydrocarbon radicals having in chemical combination therewith an aromatic mercaptan and also comprising a small amount of a hydrocarbon substituted ammonium salt.

13. A composition according to claim 12 wherein the compound of the general formula is chloro-2-butadiene-1,3.

14. A composition according to claim 12 wherein the compound of the general formula is chloro-2-butadiene-1,3 and wherein the ammonium salt is a bromide having a long straight chain aliphatic group substituted for one of the hydrogens of the ammonium radical.

15. The process which comprises incorporating a small amount of a hydrocarbon substituted ammonium salt into a heat-curable plastic polymer of a compound of the general formula

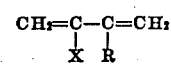

in which X is halogen and R is a member of the group consisting of hydrogen and hydrocarbon radicals having in chemical combination therewith an aromatic mercaptan.

16. A process according to claim 15 wherein the compound of the general formula is chloro-2-butadiene-1,3.

17. A composition comprising a heat-curable plastic polymer of a compound of the general formula

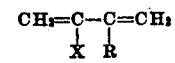

in which X is halogen and R is a member of the group consisting of hydrogen and hydrocarbon radicals having in chemical combination therewith an aliphatic mercaptan and also comprising a small amount of a hydrocarbon substituted ammonium salt.

18. A composition according to claim 17 wherein the compound of the general formula is chloro-2-butadiene-1,3.

19. A composition according to claim 17 wherein the compound of the general formula is chloro-2-butadiene-1,3 and wherein the ammonium salt is a bromide having a long straight chain aliphatic group substituted for one of the hydrogens of the ammonium radical.

20. The process which comprises incorporating a small amount of a hydrocarbon substituted ammonium salt into a heat-curable plastic polymer of a compound of the general formula

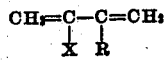

in which X is a halogen and R is a member of the group consisting of hydrogen and hydrocarbon radicals having in chemical combination therewith an aliphatic mercaptan.

21. A process according to claim 20 wherein the compound of the general formula is chloro-2-butadiene-1,3.

22. A composition comprising a heat-curable plastic polymer of chloro-2-butadiene-1,3 having in chemical combination therewith a small amount of thioglycolic-acid and a small amount of hydrogen sulfide and also comprising a small amount of a hydrocarbon substituted ammonium salt.

HOWARD W. STARKWEATHER.
ARNOLD M. COLLINS.